United States Patent
Bart et al.

(10) Patent No.: US 10,574,891 B1
(45) Date of Patent: Feb. 25, 2020

(54) CONTINUOUS OPERATION OF A CAMERA

(71) Applicant: Alarm.com Incorporated, Tysons, VA (US)

(72) Inventors: Gary Franklin Bart, Weston, FL (US); John Varn, Tysons, VA (US); Dean Constantine, Ft. Lauderdale, FL (US)

(73) Assignee: Alarm.com Incorporated, Tysons, VA (US)

( * ) Notice: Subject to any disclaimer, the term of this patent is extended or adjusted under 35 U.S.C. 154(b) by 0 days.

(21) Appl. No.: 16/117,554

(22) Filed: Aug. 30, 2018

Related U.S. Application Data

(60) Provisional application No. 62/552,144, filed on Aug. 30, 2017.

(51) Int. Cl.
*H04N 5/232* (2006.01)
*G08B 29/12* (2006.01)
*G08B 13/196* (2006.01)

(52) U.S. Cl.
CPC .  *H04N 5/232411* (2018.08); *G08B 13/19636* (2013.01); *G08B 13/19667* (2013.01); *G08B 29/12* (2013.01)

(58) Field of Classification Search
CPC ........ H04N 5/232411; G08B 13/19636; G08B 13/19667; G08B 29/12
USPC .......................................................... 348/152
See application file for complete search history.

(56) References Cited

U.S. PATENT DOCUMENTS

| | | | |
|---|---|---|---|
| 5,164,761 A | 11/1992 | Isono et al. | |
| 6,166,519 A | 12/2000 | Gault | |
| 8,824,884 B1 | 9/2014 | Trujillo | |
| 2003/0202099 A1 | 10/2003 | Nakamura et al. | |
| 2008/0246842 A1* | 10/2008 | Inoue | G06F 1/30 348/143 |
| 2009/0086043 A1 | 4/2009 | Scheucher | |
| 2011/0191391 A1* | 8/2011 | Li | G06F 16/00 707/812 |
| 2016/0134846 A1 | 5/2016 | Miller et al. | |
| 2018/0008304 A1* | 1/2018 | Nakamura | G02B 23/2407 |
| 2018/0095344 A1 | 4/2018 | Riddiford et al. | |

\* cited by examiner

*Primary Examiner* — Allen C Wong
(74) *Attorney, Agent, or Firm* — Fish & Richardson P.C.

(57) ABSTRACT

A monitoring system includes a camera that includes a removable primary power source and a secondary power source. The camera is configured to detect removal of the primary power source. The camera is configured to draw power from the secondary power source and generate a primary power source removal notification indicating that the primary power source has been removed from the camera. The monitoring system includes a monitor control unit that is configured to receive the primary power source removal notification. The monitor control unit is configured to determine whether a primary power source removal request was received within a period of time before receipt of the primary power source removal notification, the primary power source removal request indicating that the primary power source will be removed within the period of time. The monitor control unit is configured to perform a monitoring system action.

20 Claims, 5 Drawing Sheets

CONTINUOUS OPERATION OF A CAMERA

TECHNICAL FIELD

This disclosure relates to monitoring technology.

BACKGROUND

Security and surveillance systems have been utilized for years for both residential and commercial properties. Such systems may utilize a central monitoring system to detect when an alleged intrusion has occurred. For instance, the central monitoring system may be alerted when a surveillance camera that has been mounted at a particular portion of the property goes offline or is tampered in anyway.

Battery-powered surveillance cameras are gaining popularity for setting up monitoring capability without installing additional wiring. Depending on various factors such as battery type, camera type, and usage frequency, batteries of such cameras may need to be replaced in a time frame ranging from weeks to months.

SUMMARY

Techniques are described for enhancing serviceability and operational availability of cameras that are part of a monitoring system. In some implementations, a secondary power source is provided inside the camera to enable replacement of a main battery of the camera while remaining connected to the monitoring system. In some implementations, the camera enters a low power mode when operating from the secondary power source. In the same, or other implementations, in response to loss of power from the main battery, the camera transmits diagnostic information to the monitoring system before entering the low power mode.

Implementations of the described techniques may include hardware, a method or process implemented at least partially in hardware, or a computer-readable storage medium encoded with executable instructions that, when executed by a processor, perform operations.

The details of one or more implementations are set forth in the accompanying description below. Other features will be apparent from the description and the drawings.

According to an innovative aspect of the subject matter described in this application, a monitoring system is configured to monitor a property. The monitoring system includes a camera that includes a removable primary power source and a secondary power source and that is configured to: detect removal of the primary power source; and in response to detecting removal of the primary power source: draw power from the secondary power source; and generate a primary power source removal notification indicating that the primary power source has been removed from the camera; and a monitor control unit that is configured to: receive the primary power source removal notification; determine whether a primary power source removal request was received within a period of time before receipt of the primary power source removal notification, the primary power source removal request indicating that the primary power source will be removed within the period of time; and in response to determining whether the primary power source removal notification was received within the period of time before receiving the primary power source removal request, perform a monitoring system action.

These and other implementations can each optionally include one or more of the following features. The monitor control unit is configured to: determine whether the primary power source removal request was received within a period of time before receipt of the primary power source removal notification by determining that the primary power source removal request was received within the period of time before receipt of the primary power source removal notification; and perform the monitoring system action by providing, to the camera, an instruction to enter a low power mode in response to determining that the primary power source removal request was received within the period of time before receipt of the primary power source removal notification. The camera is configured to: receive the instruction to enter the low power mode; in response to receiving the instruction to enter the low power mode, enter the low power mode; detect replacement of the primary power source; and in response to detecting replacement of the primary power source, generate a primary power source replacement notification indicating that the primary power source of the camera has been replaced. The monitor control unit is configured to: receive the primary power source replacement notification; and in response to receiving the primary power source replacement notification, provide, to the camera, an instruction to exit the low power mode.

The camera is configured to enter the low power mode by: maintaining a network connection with the monitor control unit, reducing a frame rate for capturing video data, reducing a resolution for capturing the video data or image data, and storing the video data or the image data locally. The monitor control unit is configured to: determine an elapsed time between receiving the primary power source removal notification and receiving the primary power source replacement notification; determine whether the elapsed time satisfies a threshold replacement period of time; and provide, to the camera, the instruction to exit the low power mode based on determining that the elapsed time satisfies the threshold replacement period of time. The monitor control unit is configured to: determine whether the primary power source removal request was received within a period of time before receipt of the primary power source removal notification by determining that the primary power source removal request was received within the period of time before receipt of the primary power source removal notification; and perform the monitoring system action by providing, to the camera, an instruction to enter a low power mode in response to determining that the primary power source removal request was received within the period of time before receipt of the primary power source removal notification.

The camera is configured to receive the instruction to enter the low power mode; and in response to receiving the instruction to enter the low power mode, enter the low power mode. The monitor control unit is configured to: determine an elapsed time since providing the instruction to enter the low power mode; determine that the elapsed time since providing the instruction to enter the low power mode does not satisfy a threshold replacement period of time; and in response to determining that the elapsed time since providing the instruction to enter the low power mode does not satisfy the threshold replacement period of time, provide, for output, a notification indicating to replace the primary power source. The monitor control unit is configured to: determine whether the primary power source removal request was received within a period of time before receipt of the primary power source removal notification by determining that the primary power source removal request was received within the period of time before receipt of the primary power source removal notification; determine that the monitoring system is unarmed; and perform the monitoring system action by providing, to the camera, an instruction to enter a low power mode based on determining that the monitoring system is unarmed and based on determining that the primary power source removal request was received within the period of time.

The monitor control unit is configured to: determine that the monitoring system is in armed away mode; and perform the monitoring system action by generating an alarm based on determining that the monitoring system is in armed away mode. The monitor control unit is configured to: determine whether the primary power source removal request was received within a period of time by determining that the primary power source removal request was not received within the period of time; and perform the monitoring system action by generating an alarm based on determining that the primary power source removal request was not received within the period of time. The monitoring system includes an additional camera. The monitor control unit is configured to: determine whether the primary power source removal request was received within a period of time by determining that the primary power source removal request was not received within the period of time; and perform the monitoring system action by providing, to the additional camera, an instruction to move to capture a field of view of the camera.

The monitor control unit is configured to: determine whether the primary power source removal request was received within a period of time before receipt of the primary power source removal notification by determining that the primary power source removal request was not received within the period of time before receipt of the primary power source removal notification; and perform the monitoring system action by providing, to the camera, an instruction to capture video data and transmit the video data to the monitor control unit before entering a low power mode. The monitor control unit is configured to: determine whether the primary power source removal request was received within a period of time before receipt of the primary power source removal notification by determining that the primary power source removal request was not received within the period of time before receipt of the primary power source removal notification; and perform the monitoring system action by providing, to the camera, an instruction to transmit a power level of the primary power source at a time of detecting removal of the primary power source.

The camera is configured to receive the instruction to transmit the power level of the primary power source at the time of detecting removal of the primary power source; transmit, to the monitor control unit, data indicating the power level of the primary power source at the time of detecting removal of the primary power source. The monitor control unit is configured to: receive the data indicating the power level of the primary power source at the time of detecting removal of the primary power source; and perform the monitoring system action based on the power level of the primary power source at the time of detecting removal of the primary power source. The monitor control unit is configured to: determine that the power level of the primary power source at the time of detecting removal of the primary power source is less than a threshold power level; and perform the monitoring system action by generating a notification to replace the primary power source based on determining that the power level of the primary power source at the time of detecting removal of the primary power source is less than a threshold power level. The monitor control unit is configured to: determine that the power level of the primary power source at the time of detecting removal of the primary power source is greater than a threshold power level; and perform the monitoring system action by generating an alarm based on determining that the power level of the primary power source at the time of detecting removal of the primary power source is greater than a threshold power level.

According to an innovative aspect of the subject matter described in this application, a method includes the actions of detecting, by a camera of a monitoring system that is configured to monitor a property, removal of a primary power source, the camera including the removable primary power source and a secondary power source; in response to detecting removal of the primary power source, drawing, by the camera, power from the secondary power source; determining, by camera, whether a primary power source removal request was received within a period of time before detecting the removal of the primary power source, the primary power source removal request indicating that the primary power source will be removed within the period of time; in response to determining whether the primary power source removal notification was received within the period of time before receiving the primary power source removal request, performing, by the camera, an action.

These and other implementations can each optionally include one or more of the following features. The actions include determining whether the primary power source removal request was received within a period of time before detecting the removal of the primary power source by determining that the primary power source removal request was received within the period of time before detecting the removal of the primary power source; performing the action by entering, by the camera, a low power mode in response to determining that the primary power source removal request was received within the period of time; detecting, by the camera, replacement of the primary power source; and in response to detecting replacement of the primary power source, exiting, by the camera, the low power mode.

The actions include determining whether the primary power source removal request was received within a period of time before detecting the removal of the primary power source by determining that the primary power source removal request was received within the period of time before detecting the removal of the primary power source; perform the action by entering, by the camera, a low power mode in response to determining that the primary power source removal request was received within the period of time; determining, by the camera, an elapsed time since entering the low power mode; determining, by the camera, that the elapsed time since entering the low power mode does not satisfy a threshold replacement period of time; and in response to determining that the elapsed time since entering the low power mode does not satisfy the threshold replacement period of time, providing, for output by the camera, a notification indicating to replace the primary power source. The actions include determining whether the primary power source removal request was received within a period of time by determining that the primary power source removal request was received within the period of time; determining, by the camera, that the monitoring system is unarmed; and performing the action by entering, by the camera, a low power mode based on determining that the monitoring system is unarmed and based on determining that the primary power source removal request was received within the period of time.

The actions include determining that the monitoring system is in armed away mode; and performing the action by generating, by the camera, an alarm based on determining that the monitoring system is in armed away mode. The actions include whether the primary power source removal request was received within a period of time by determining that the primary power source removal request was not received within the period of time; and performing the action by generating, by the camera, an alarm based on determining that the primary power source removal request was not received within the period of time. The actions include determining whether the primary power source removal request was received within a period of time by determining that the primary power source removal request was not received within the period of time; and performing the action by capturing, by the camera, video data before entering a low power mode.

Other implementations of this aspect include corresponding systems, apparatus, and computer programs recorded on computer storage devices, each configured to perform the operations of the methods.

Particular implementations of the subject matter described in this specification can be implemented so as to realize one or more of the following advantages. A monitoring system may be able to detect tampering with a camera. Detecting tampering will improve the reliability and security of the monitoring system.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Techniques are described for enhancing serviceability and operational availability of cameras that are part of a monitoring system. In some implementations, a secondary power source is provided inside the camera to enable replacement of a main battery of the camera while remaining connected to the monitoring system. In some implementations, the camera enters a low power mode when operating from the secondary power source. In the same, or other implementations, in response to loss of power from the main battery, the camera transmits diagnostic information to the monitoring system before entering the low power mode.

Figure 1:
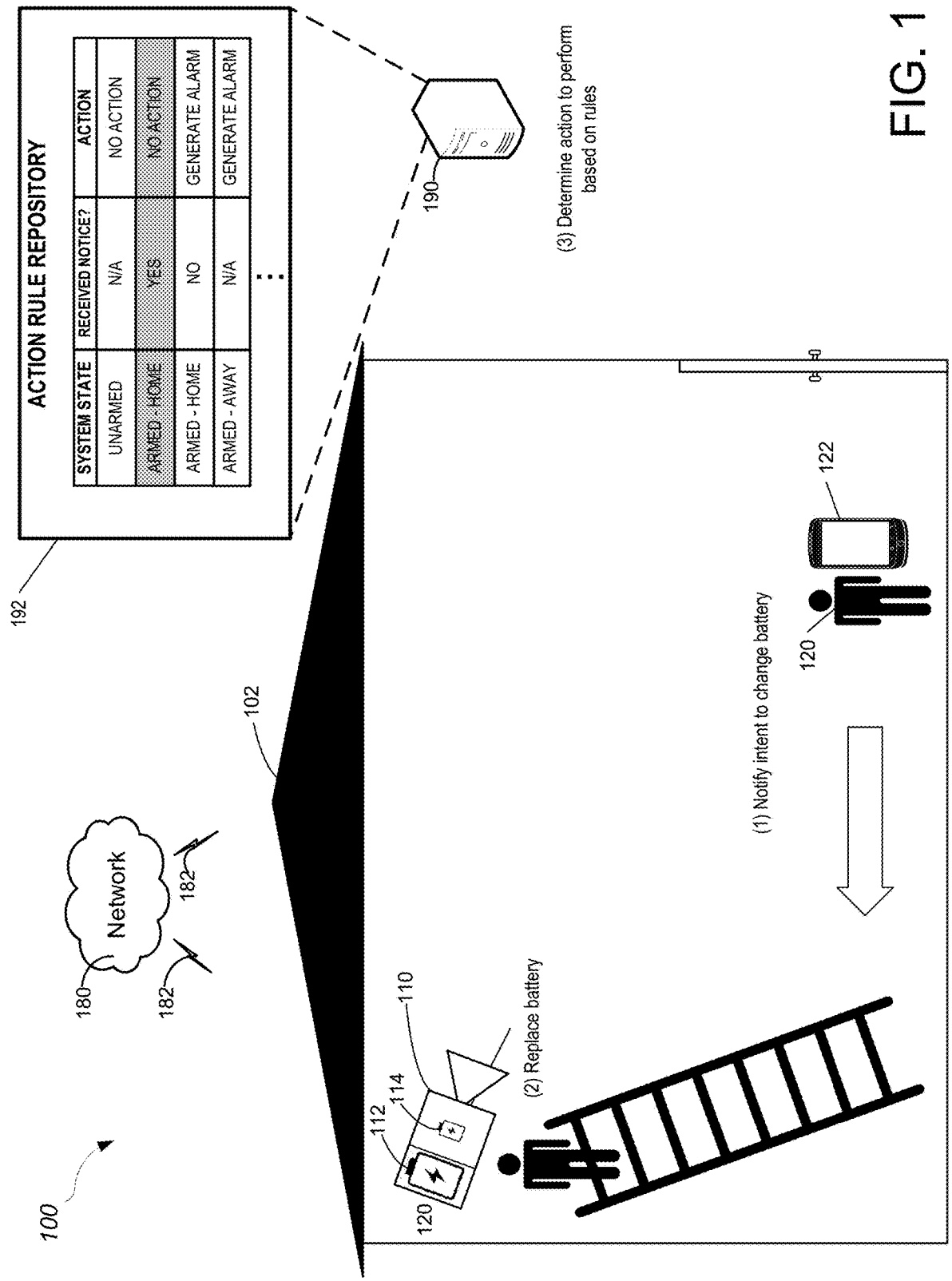
FIG. 1 illustrates a contextual diagram of an example system for continuous operation of a battery-operated camera while changing the batteries.

FIG. 1 illustrates a contextual diagram of an example of a monitoring system 100 for continuous operation of a battery-operated camera while changing the batteries. The monitoring system 100 includes one or more surveillance cameras 110 installed in a property 102 (e.g., a home) of a user 120, a network 180, one or more communication links 182, and a monitoring application server 190. The user 120 may control, interact with, and/or receive information from the monitoring system 100 through a user device 122.

For conventional battery-operated cameras, a process for changing the battery of such cameras typically involves powering down the camera, removing the depleted battery, installing a new or recharged battery in the camera, and then waiting for the camera to power back up and reestablish its network connection to the monitoring system to verify proper operation of the camera after replacing the battery. This power cycling and reestablishment of connection can significantly increase the time needed for performing battery replacements. Such inconvenience can be mitigated by providing a secondary power source for the camera.

The camera 110 includes a main battery 112 and a secondary power source 114. The main battery 112 may provide power sufficient for extended operation of the camera 110 in a normal operation mode. Examples of the main battery 112 include disposable batteries, rechargeable batteries, and battery packs. The main battery 112 may be designed such that it can be easily removed by the user 120 during a battery replacement procedure. In some implementations, the main battery 112 is a rechargeable battery pack that magnetically attaches to the camera 110 to allow quick and convenient replacement of the main battery 112.

The secondary power source 114 may provide power sufficient for temporary operation of the camera 110 in an event when the main power from the main battery 112 is disrupted. As such, the power capacity of the secondary power source 114 may be smaller than that of the main battery 112. Examples of the secondary power source 114 include capacitors, supercapacitors, disposable batteries, and rechargeable batteries. In the case where the secondary power source 114 is rechargeable (e.g., capacitor, supercapacitor, rechargeable battery), the secondary power source 114 may be recharged by the main battery 112 to ensure continuous availability of secondary power in the event of disruption of the main power from the main battery 112. For consumer applications where cost is an important factor, use of capacitors or supercapacitors as the secondary power source 114 may be preferable from a cost perspective.

In some implementations, the secondary power source 114 may include more than one power source. For example, the secondary power source 114 may include both a supercapacitor and a battery. In such a configuration, for example, the supercapacitor can act as an initial source of secondary power, and once the supercapacitor has been drained, the battery can continue to provide secondary power. Such configuration may be beneficial in extending the lifetime of the secondary power source 114 due to reduced cycling of the battery of the secondary power source 114.

In handling the main power from the main battery 112 and the secondary power from the secondary power source 114, the camera 110 may monitor the main power and the secondary power to determine which power source to draw power from. For example, the camera 110 may monitor a voltage of the main battery 112, and when the voltage falls below a predetermined value, e.g., 3.0 V for a typical Lithium ion battery pack, the camera 110 may automatically switch to the secondary power source 114 without user intervention. As another example, when the main battery 112 is removed for main battery replacement, the voltage at a receiving terminal for the main battery may fall below the predetermined value (e.g., fall to 0 V), causing the camera 110 to switch to the secondary power source 114. Switching from the main battery 112 to the secondary power source 114 when the voltage is below the predetermined value may ensure that a sufficient voltage is continuously available to power the camera 110. In some implementations, one or more capacitors may be provided to buffer a voltage transient that may result from switching from the main power to the secondary power.

The camera 110 may provide a notification when determining to switch power sources. For example, the camera 110 may determine to provide a notification that the main battery 112 is not available when the camera 110 determines to switch to the secondary power source 114. An example of such notification may be "Warning: Main battery power not available, running on secondary power source." Such notification may be sent to the monitoring application server 190 which may then provide a notification to the user device 122 of the user 120.

The camera 110 may provide a notification or a series of notifications when an issue with a power source is detected. For example, the camera 110 may determine to provide a notification prompting a replacement of the main battery 112 when the camera 110 determines that there is little power remaining in the main battery 112. An example of such a notification may be, "The main battery is due to be changed. Estimated remaining lifetime: 5 days." Additional notifications may be sent, for example, each day until either the main battery 112 is replaced or becomes fully depleted. In some implementations, an audible alarm may be generated by the camera 110 to remind the user 120 to replace the main battery 112.

In some implementations, the notifications may include additional details regarding the main battery 112 and the secondary power source 114. For example, the camera 110 may provide a notification, "Capacity of the main battery has fallen to below 50% of its original capacity. Please order a replacement main battery." As another example, the camera 110 may provide a notification, "Secondary power source is unable to hold sufficient reserve power. Please contact support to replace secondary power source."

The camera 110 may have a normal operation mode and a low power mode of operation. When operating in the normal operation mode, the camera 110 may provide a complete range of functionalities, such as recording of video and transmission of the video through the network 180 over the communication link 182 (e.g., wireless communication link) to the monitoring application server 190.

In contrast, when operating in the low power mode, the camera 110 may turn off some or all hardware components and software routines that are not essential to maintaining a minimally operational state of the camera 110. Examples of essential operations include maintaining a network connection between the camera 110 and the monitoring system 100, and measuring available power through the main battery 112 and/or the secondary power source 114. Examples of non-essential components and software routines include image sensors for acquisition of video and video codec for processing the acquired video, which may be turned off or disabled to reduce power consumption. Additionally, one or more processors of the camera 110 may be turned off and/or reduced in clock frequency.

The camera 110 remains connected to the monitoring system 100 when operating in the low power mode. As such, upon restoration of the main power from the main battery 112, the camera 110 may exit the low power mode and be immediately restored to fully operational state. For example, video transmission to the monitoring system 100 may be resumed without requiring additional user intervention. Such immediate restoration to fully operational state may enhance user convenience and minimize downtime of the camera 110.

While a battery-operated camera 110 is described, the camera 110 can be operated through other power sources. For example, the main battery 112 can be replaced with appropriate wired electrical connections (e.g., building wiring conducting standard utility electricity) while maintaining the benefits provided by the secondary power source 114.

In the example shown in FIG. 1, the user 120 of the monitoring system 100 may wish to change the main battery 112 of the camera 110. For example, the user 120 may have received a notification through the user device 122 advising replacement of the main battery 112. In proceeding to change the main battery 112, the user 120 first notifies the monitoring system 100 that the user is going to change the main battery 112 of the camera 110. For example, the user 120 can use a monitoring application that runs on the user device 122 to provide a battery change notice, informing the monitoring system 100 of the user's intent to change the main battery 112. When the monitoring system 100 receives the battery change notice, the notice can be stored on the monitoring application server 190. Additionally and/or alternatively, the notice can be communicated to and stored on the camera 110.

The user 120 proceeds to replace the main battery 112 by first disconnecting the original main battery attached to the camera 110. When the main battery 112 is disconnected from the camera, the camera detects that the main power is lost and automatically switches to the secondary power source 114. At this time, the camera 110 may generate and transmit an event to the monitoring application server 190 notifying disconnection of the main battery 112. The camera 110 may enter the low power mode to conserve the limited energy available in the secondary power source 114 while remaining connected to the monitoring system 100.

In some implementations, the user may provide a battery change notice to the monitoring system 100 but does not follow up by changing the main battery 112. For example, the user 120 may become distracted with some other tasks that requires the user's attention and forget to change the main battery 112. In such situations, the monitoring system 100 may dismiss the received battery change notice after a predetermined period of time has passed (e.g., 5, 10, 15, or 30 minutes).

The monitoring application server 190 receives the disconnection event of the main battery 114 and determines an action to perform. For example, the action to perform may be based on action rules of an action rule repository 192. The action rule repository 192 may be a list of rules that determine actions to be performed based on various variables of the monitoring system 100. Examples of such variables include a system state of the monitoring system 100, and whether a battery change notice has been received. For example, when the monitoring system is in an unarmed state, the disconnection event does not result in any action by the monitoring system 100.

When the monitoring system is in an armed—at home state, the action to be performed by the monitoring system 100 may depend on whether the notice has been received. If the notice has been received, then the monitoring system 100 does not perform any action in response to the disconnection event as the battery disconnection event is expected during changing of the main battery 112. However, if the notice has not been received and the battery disconnection event is received, the monitoring system 100 generates an alarm event, as the disconnection event was not expected, and may be indicative of a tampering event by an intruder at the property 102.

When the monitoring system is in an armed—away state, the monitoring system 100 may generate an alarm event in response to the battery disconnection event regardless of whether the notice has been received. This may be under the logic that if the user is away from the property, any action taken on the property 102 is by an unauthorized personnel (e.g., intruder). In another example, the battery change notice may take precedence over the armed state of the system, under the logic that if the user 120 has authorized the battery change by providing the notice, the user 120 expects the disconnection event to take place and therefore generating an alarm event is not desired.

In the example shown in FIG. 1, the monitoring system is in the armed—at home state, and the user 120 has provided the battery change notice to the monitoring system 100. Accordingly, no action is performed by the monitoring application server 190 in response to the battery disconnection event. The user 120 proceeds to mount the replacement main battery to the camera 110. The camera detects that the main battery 112 has been replaced and exits the low power mode, resuming normal operation.

Figure 2:
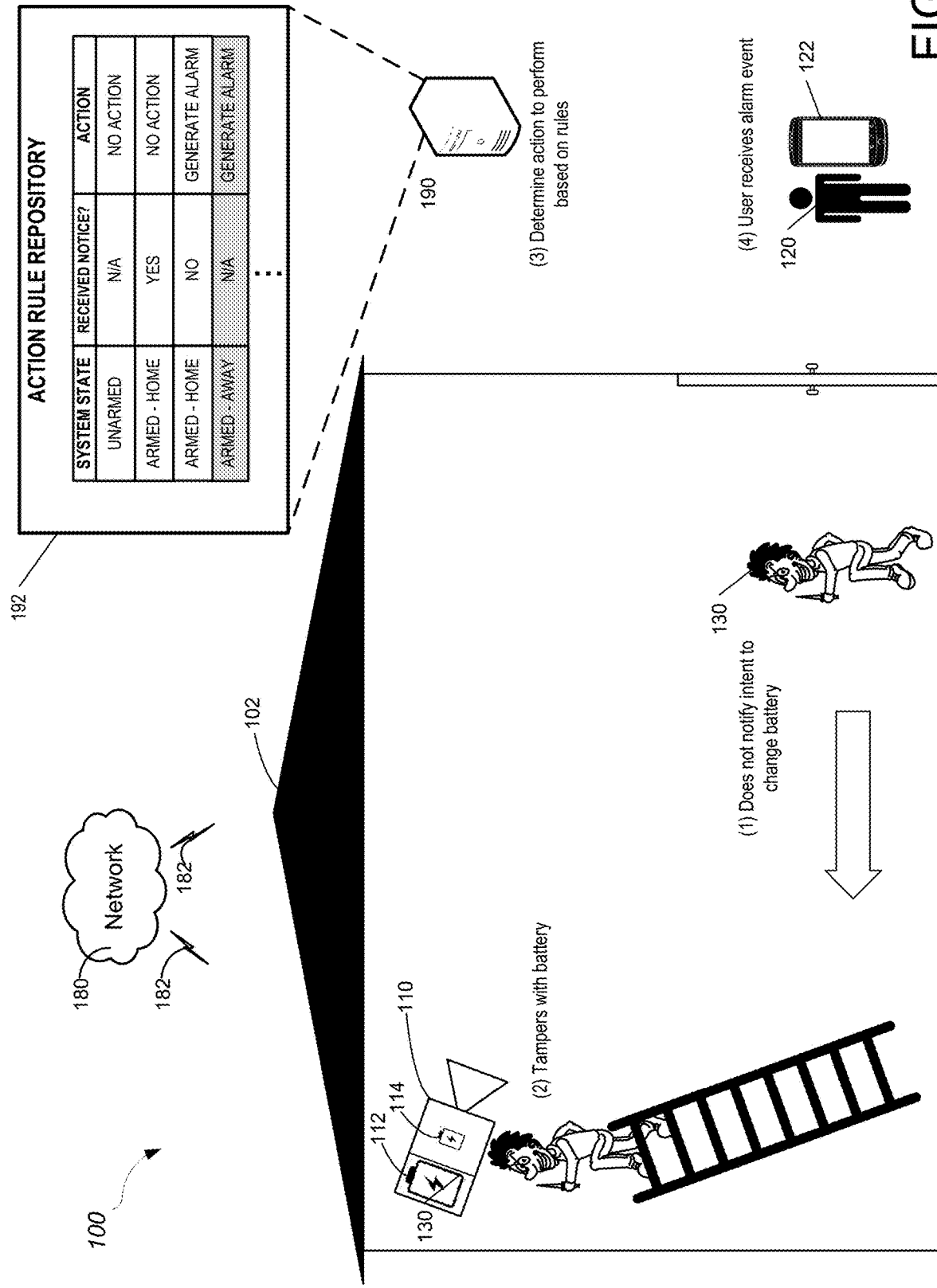
FIG. 2 illustrates another contextual diagram of an example system for continuous operation of a battery-operated camera during a tampering event.

FIG. 2 illustrates another contextual diagrams of an example system for continuous operation of a battery-operated camera during a tampering event. In the example shown in FIG. 2, the user 120 is away from the property 102, and the monitoring system 100 is in the armed—away state. In absence of the user 120, an intruder 130 may attempt to disable the camera 110 by tampering with the main battery 112 to avoid being recorded. However, as the intruder 130 is not an authorized user of the monitoring system 100, the intruder is unable to provide the battery change notice to the system.

When the intruder 130 disconnects the battery, the camera 110 detects that the main power is lost and automatically switches to the secondary power source 114. At this time, the camera 110 may generate and transmit an event to the monitoring application server 190 notifying disconnection of the main battery 112. At this time, the camera 110 may transmit diagnostic information to the monitoring server 190. The diagnostic information may include one or more still images or video clips recorded by the camera 110 at or shortly after the time of battery disconnection event. For example, the intruder 130 may not be aware of the presence of the secondary power source 114 and reveal his or her identity after removing the main battery 112, which may be captured in the transmitted diagnostic information.

The monitoring application server 190 then receives the disconnection event and determines the action to perform based on the action rule repository 192. In this case, as the monitoring system 100 is in the armed—away state and the battery change notice has not been received, an alarm event is generated in response to the disconnection event. The generated alarm event may then be transmitted to the user device 122, notifying the user 120 of the alarm event caused by the intruder 130 at the property 102.

While the determination of action to be performed by the monitoring system 100 is performed by the application monitoring server 190 in the examples given, the determination can be performed locally on the camera 110. For example, the battery change notice and the system armed status may be transmitted to and stored on the camera 110, which may allow the camera 110 to locally generate an alarm event based on the action rules.

Figure 3:
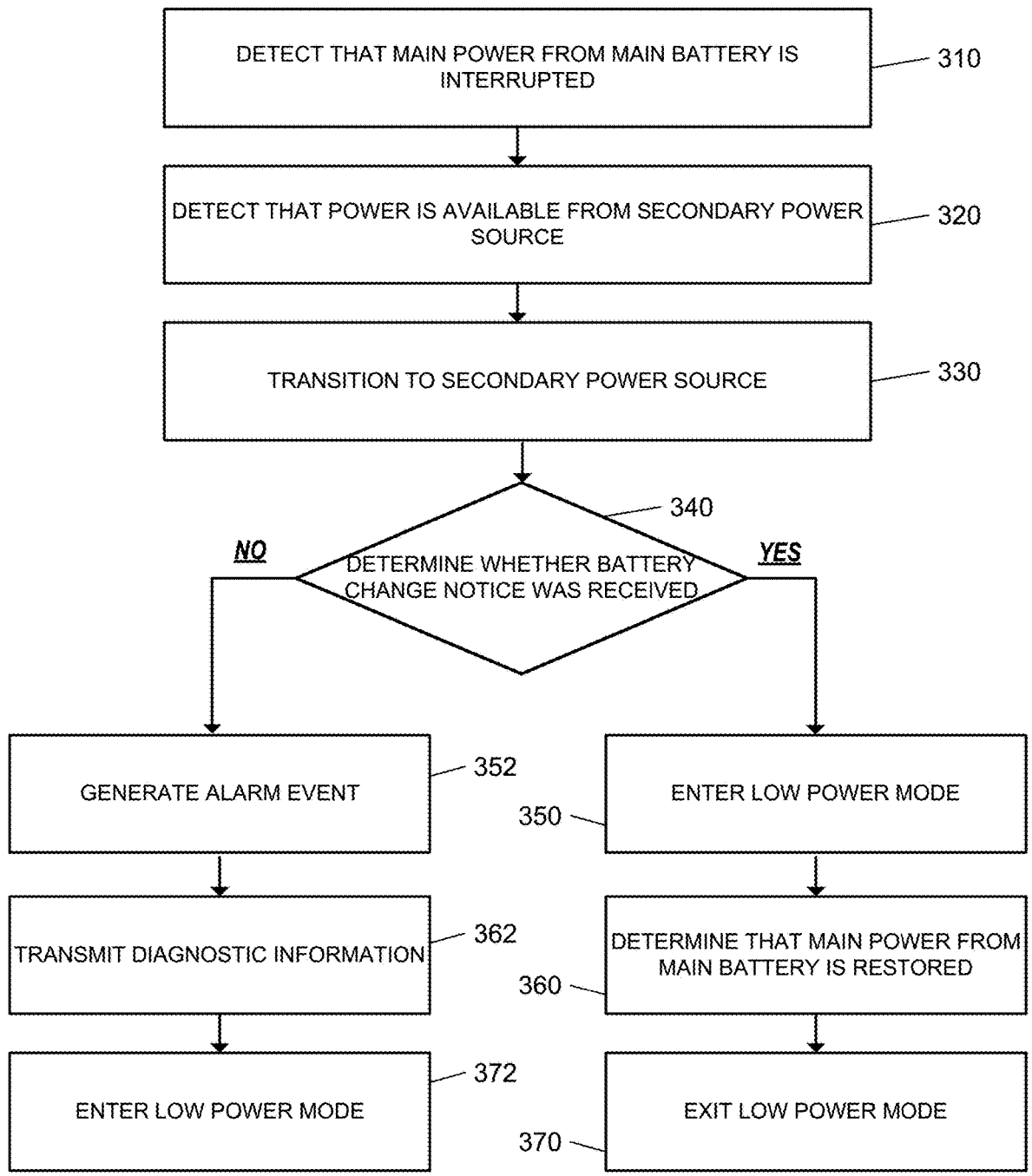
FIG. 3 is a flow chart of an example process for continuous operation of a battery-operated camera while changing the batteries.

FIG. 3 illustrates an example process 300 for continuous operation of a battery-operated camera 110. The camera 110 detects that the main power from the main battery 112 is interrupted (310). The action of detecting that the main power is interrupted may include determining that the voltage of the main battery 112 has fallen below a first predetermined value. For example, when the main battery 112 is nearing depletion, the voltage of the main battery 112 may fall below the first predetermined value. The first predetermined value, for example, may be a minimum voltage needed to assure reliable operation of the camera 110. As another example, when the main battery 112 is disconnected from the camera 110, the voltage at a receiving terminal of the camera 110 for receiving the main battery 112 may fall below the predetermined value. Additionally, or alternatively, the action of detecting that the main power is interrupted may include detecting a physical presence of the main battery 112. For example, a physical contact sensor or a proximity sensor may be used to determine the physical presence of the main battery 112.

The camera 110 detects that power is available from the secondary power source 114 (320). The action of detecting that power is available from the secondary power source 114 may include determining that the voltage of the secondary power source 114 is above a second predetermined value. The second predetermined value may be equal to, or higher than the first predetermined value. For example, in the case when the secondary power source 114 fails to provide sufficient voltage for operation of the camera 110, the camera 110 may continue to operate on the main power from the main battery 112 as that may result in a longer operation of the camera 110 than switching to the secondary power source 114.

In some implementations, the second predetermined value may be determined based on the type (e.g., capacitor, supercapacitor, battery), a capacity, or combination thereof of the secondary power source 114.

The camera 110 transitions to the secondary power source 114 (330). The transitioning to the secondary power source 114 may include internally switching the power source connected to a power supply regulation circuit of the camera 110 sufficiently fast (e.g., faster than 1 ms, 500 µs 250 µs, 100 µs, 50 µs, 10 µs) such that the network connection between the camera 110 and the monitoring system 100 is maintained during the transitioning, and/or normal operation of the camera 110 is maintained during the transitioning.

The monitoring system 100 determines whether a battery change notice was received (340). In some implementations, the determination is made by the monitoring application server 190. In some implementations, the determination is made by the camera 110 based on the notification received from the monitoring application server 190. In some implementations, the determination is made by the camera 110 based on the notification received directly from the user device 122.

Based on the determination that the battery change notice was received, the camera 110 enters the low power mode (350). The entering the low power mode may include turning off some or all hardware components and software routines that are not essential to maintaining a minimally operational state of the camera 110. For example, the camera 110 may maintain a network connection with the monitoring system 100 while turning off or disabling the image sensors for acquisition of video and video codec for processing the acquired video.

The camera 110 determines that main power from the main battery 112 is restored (360). Determining that the main power is restored may include determining that the voltage of the main battery 112 is at or above the first predetermined value.

The camera 110 exits low power mode (370). The action of exiting the low power mode may include entering the normal operation mode. For example, the action of entering of normal operation mode may include turning back on and enabling the hardware components and software routines turned off or disabled when entering the low power mode.

Based on the determination that the battery change notice was not received, the monitoring system 100 generates an alarm event (352). The generating of an alarm event may be based on the action rules of the action rule repository 192. In some implementations, the action rule repository 192 is stored in the monitoring application server 190, and the alarm event is generated by the server 190. In some implementations, the action rule repository 192 is stored in the camera 190, and the alarm event is generated by the camera 110.

The camera 110 transmits diagnostic information to the monitoring application server 190 (362). The diagnostic information may be generated while the camera 110 is operating from the secondary power source 114. A portion of power available from the secondary power source 114 may be consumed in generation and transmission of the diagnostic information. The diagnostic information may include various information that can help determine the situation under which the camera 110 has switched over to the secondary power source 114. For example, the diagnostic information may include current voltage of the main battery 112, one or more still images or video clips recorded by the camera 110 since transitioning to the secondary power source 114, and accelerometer data. The current voltage of the main battery 112 may provide information on whether the main battery 112 has been disconnected or depleted while remaining connected to the camera 110. The one or more still images or video clips may provide situational awareness to help assess the situation at the property 102. For example, an unsuspecting intruder may not be aware of the presence of the secondary power source 114 and reveal his or her identity after removing the main battery 112. The accelerometer data of the camera 110 may provide information on whether physical force has been applied to the camera 110 before the main power was interrupted, which may provide additional insight regarding the nature of the event that caused the interruption.

The camera 110 enters low power mode (372). The step 372 may be identical to step 350.

In some implementations, the camera 110 may automatically or manually exit the low power mode entered in step 372. For example, the user 120 may wish to obtain additional surveillance images or video clips from the camera 110 after receiving the generated alarm event. In such a case, the user may manually command the camera 110 to exit the low power mode and acquire additional images or video clips. As another example, the camera may periodically (e.g., every 30 seconds, 1 minute, 2 minutes, or 5 minutes) exit the low power mode without user intervention to acquire additional images or video clips, then return to the low power mode. The period may be predetermined or set by the user 120.

Figure 4:
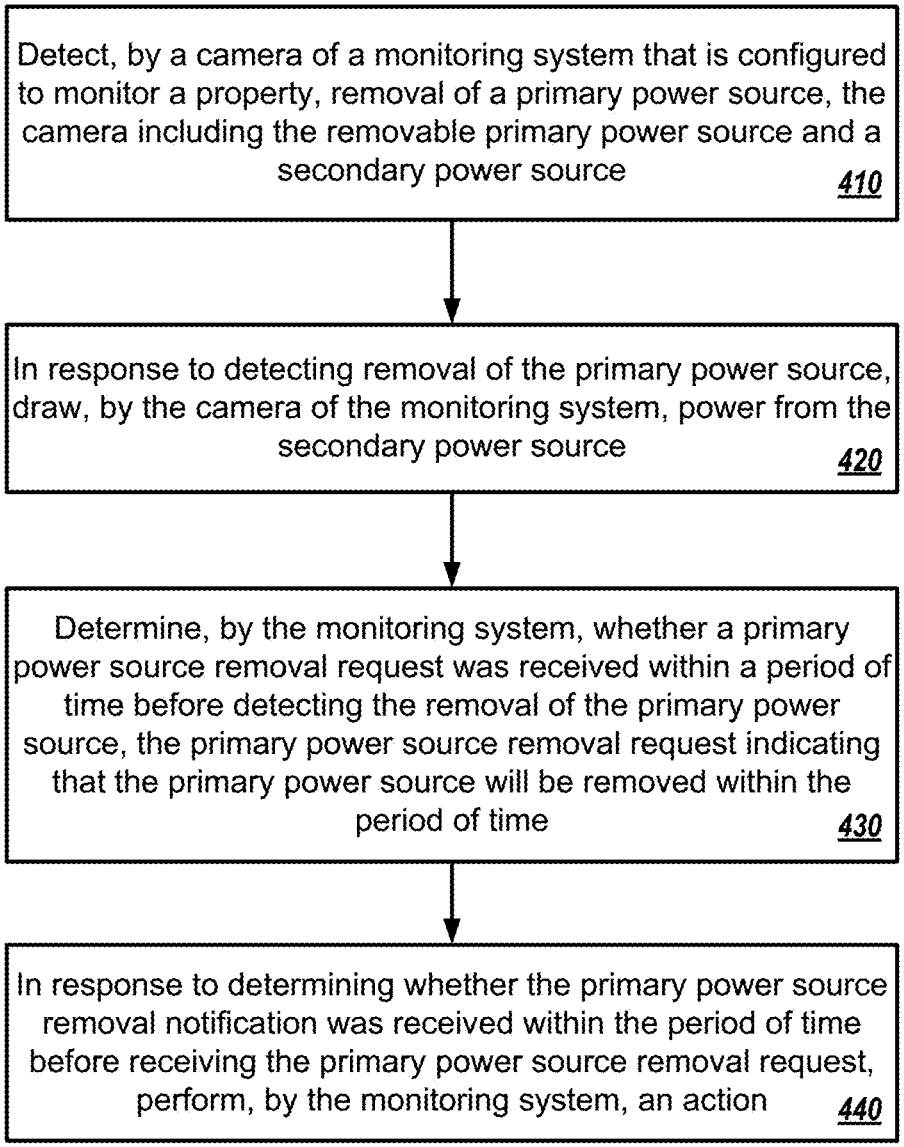
FIG. 4 is a flow chart of an example process for continuous operation of a camera while changing the removable power source.

FIG. 4 is a flow chart of an example process 400 for continuous operation of a camera while changing the removable power source. In general, the process 400 allows a monitoring system to monitor a property while a replacing a power source (e.g., battery) of a camera. The process 400 will be described as being performed by a monitoring system or any component of a monitoring system. For example, process 400 may be performed by the monitoring system 100 of FIG. 1, the monitoring system 100 of FIG. 2, the camera 110 of FIG. 1, the camera 110 of FIG. 2, the monitoring application server 190 of FIG. 1, the monitoring application server 190 of FIG. 2, the monitoring system 500 of FIG. 5, the monitoring application server 560 of FIG. 5, the monitor control unit 510 of FIG. 5, the camera 530 of FIG. 5, or any combination of these.

The system detects removal of a primary power source of the camera. The camera includes a removable primary power source and a secondary power source (410). In some implementations, the camera is battery powered. The primary power source is a removable battery. The secondary power source may be a capacitor or another battery. The secondary power source may not be removable. The camera may be a video camera or a still image camera and may include a microphone. The camera may be a standalone camera and/or store images or videos locally or in the cloud. The camera may be part of a monitoring system that is configured to monitor a property. The camera may capture images or video within the camera's field of view. The camera may be configured to pan or zoom.

In some implementations, the camera is capable of capturing images or video at different resolutions, with lower resolutions consuming less power. In some implementations, the camera is capable of capturing video at different frame rates, with lower frame rates consuming less power. In some implementations, the camera stores a timestamp at the time the primary power source is removed. In some implementations, the camera transmits the timestamp to the system and indicates that the primary power source has been removed.

The system, in response to detecting removal of the primary power source, draws, through the camera, power from the secondary power source (420). For example, a person removes the battery and the camera switches to the capacitor or the secondary battery.

The system determines whether a primary power source removal request was received within a period of time before detecting the removal of the primary power source, the primary power source removal request indicating that the primary power source will be removed within the period of time (430). The primary power source removal request may be provided by a user before the user removes the primary power source. The user may provide the primary power source removal request through the system via an application running on a computing device or via a panel of the system. In some implementations, the primary power source may be removed from an intruder or other unauthorized user who is attempting to disable the camera. In this instance, it is unlikely that the intruder is able to transmit a primary power source removal request to the system. In some implementations, the primary power source may be depleted which may cause the camera to switch to the secondary power source. In some implementations, the camera may include a sensor that detects whether the primary power source is attached to the camera even if the primary power source is depleted.

The system, in response to determining whether the primary power source removal notification was received within the period of time before receiving the primary power source removal request, performs a monitoring system action (440). In some implementations, the monitoring system action is generating an alarm, notifying a resident of the property that the primary power source has been removed, and/or adjusting other cameras or sensors of the system to compensate for the camera with the missing primary power source. The monitoring system action or actions may depend on the status of the system (e.g., unarmed, armed stay, armed away, etc.), the elapsed time since the primary power source was removed, whether the system received a primary power source removal request, the power level of the primary power source at the time of the removal, and/or any other similar criteria.

In some implementations, the system receives a primary power source removal request. The primary power source is removed from the camera. The camera transmits a notification to the system indicating that the primary power source was removed from the camera. The system instructs the camera to enter a low power mode. The camera enters the low power mode. Once a new and/or charged primary power source is replaces, the camera notifies the system that the primary power source has been replaces. The system then instructs the camera to exit the low power mode. In some implementations, the low power mode includes maintaining a network connection with the system, reducing a frame rate for capturing video data, reducing a resolution for capturing the video data or image data, storing the video data or the image data locally, and/or any other similar action. In some implementations, the system confirms that the primary power source was replaced quickly enough. For example, the primary power source may be removed at time equals zero and replaced at time equals twenty seconds. Because twenty is less than a threshold of thirty, the system may take no further action other than requesting that the camera to exit the low power mode.

In some implementations, the system receives a primary power source removal request. The primary power source is removed from the camera. The camera transmits a notification to the system indicating that the primary power source was removed from the camera. The system instructs the camera to enter a low power mode. The camera enters the low power mode. The system may wait for an indication that the battery has been replaced. If the system waits longer than a threshold replacement period of time, the system may generate and transmit a notification to a user indicating to replace the primary power source of the camera. For example, the primary power source may be removed at time equals zero. At time equals thirty seconds, the system has not received an indication of the primary power source being replaced. The system generates and transmits a notification to a resident of the property indicating to replace the primary power source of the camera.

In some implementations, the arming status of the system may be a factor in what action the system takes in response to the removal of the primary power source of the camera. For example, the system may receive a primary power source removal request and be unarmed. The system may instruct the camera to enter low power mode upon receiving the indication that the primary power source has been removed. As another example, the system may be armed away and receive a primary power source removal request. In this instance, the system may instruct the camera to enter low power mode upon receiving the indication that the primary power source has been removed or instruct the camera to capture and transmit or store additional video (e.g., ten seconds) before entering low power mode. The system may also instruct the camera to store or transmit any buffed video before the primary power source was removed. As another example, the system may be armed stay. In this instance, even if the system receives a primary power source removal request, the system may generate an alarm in response to receiving an indication that the primary power source was removed. In some implementations, a user may request to remove the primary power source from a camera while the system is armed stay or away. The system may instruct the user to unarm the system before removing the primary power source from the camera.

In some implementations, the system may receive a primary power source removal request three minutes before removal of the battery from the camera. In this instance, three minutes may be greater than the time limit of two minutes that the user has before removing the primary power source after indicating the intent to remove the primary power source. In other words, the primary power source removal request may expire after a period of time (e.g., two minutes). If the primary power source removal request has expired and the system has not received a primary power source removal request within the period of time, the system may generate an alarm in response to the camera detecting removal of the primary power source.

In some implementations, the system may receive an indication that the primary power source was removed from the camera. The system may have not received a primary power source removal request within the period of time. In response, the system may instruct an additional camera that remains powered to pan and/or zoom to cover the field of view of the camera with the removed primary power source. The system may provide this instruction to the additional camera even if the system receives a primary power source removal request. The system may provide similar instructions to other sensors to ensure coverage for the loss of the camera while the primary power source is removed.

In some implementations, the system may receive an indication that the primary power source was removed from the camera. The system may have not received a primary power source removal request within the period of time. In response, the system may instruct the camera to capture a few seconds of video (e.g., ten seconds) before entering low power mode. Additionally or alternatively, the system may instruct the camera to save and/or transmit any image or video data stored in the buffer before the removal of the primary power source.

In some implementations, the camera may transmit the power level of the primary power source periodically or with the indication that the primary power source was removed. The system may use this information to determine the appropriate monitoring system action. In some instances, the camera may detect the removal of the primary power source when the primary power source is drained. This may be the case if the camera does not include an additional way to detect whether the primary power source is connected, such as through a mechanical sensor, proximity sensor, light sensor, or any other similar type of sensor.

In some implementations, the system may receive an indication that the primary power source was removed from the camera and data indicating that the primary power source is below a threshold. In this instance, the system may guess that the primary power source is dead and send a notification to replace the primary power source. For example, the camera may indicate that the primary power source is at three percent, which is below the threshold of five percent. In this case, the primary power source may be insufficient to power the camera and the system may send a notification to replace the primary power source.

In some implementations, the system may receive an indication that the primary power source was removed from the camera and data indicating that the primary power source is above a threshold. In this instance, the system may guess that the primary power source has been removed and/or tampered with and generate an alarm. For example, the camera may indicate that the primary power source is at fifty percent, which is above the threshold of five percent. In this case, the primary power source may generate an alarm or any other similar action.

Figure 5:
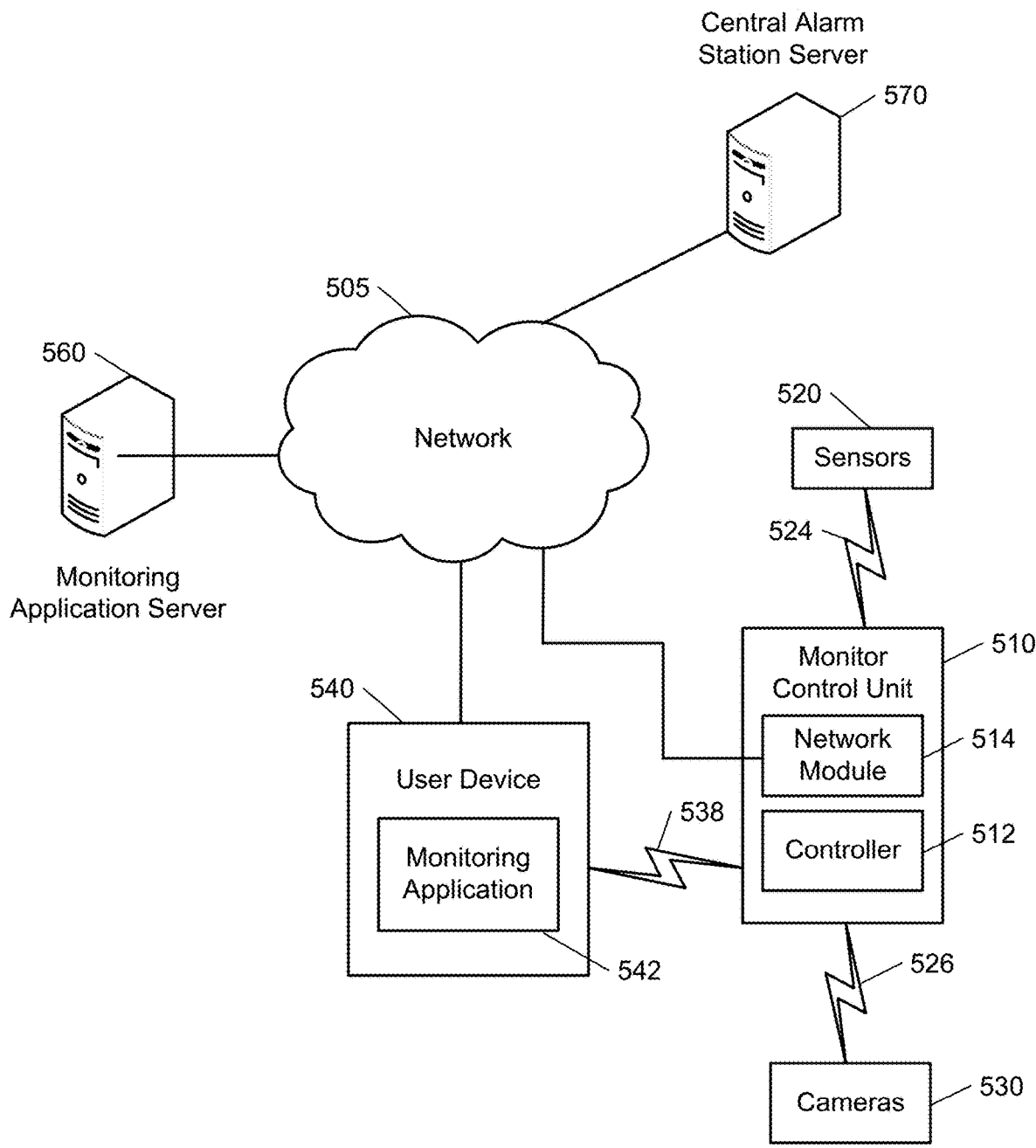
FIG. 5 illustrates an example monitoring system.

FIG. 5 illustrates an example of a system 500 configured to monitor a property. The system 500 includes a network 505, a monitoring system control unit 510, one or more user devices 540, and a monitoring application server 560. The network 505 facilitates communications between the monitoring system control unit 510, the one or more user devices 540, and the monitoring application server 560. The network 505 is configured to enable exchange of electronic communications between devices connected to the network 505. For example, the network 505 may be configured to enable exchange of electronic communications between the monitoring system control unit 510, the one or more user devices 540, and the monitoring application server 560. The network 505 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 505 may include multiple networks or subnetworks, each of which may include, for example, a wired or wireless data pathway. The network 505 may include a circuit-switched network, a packet-switched data network, or any other network able to carry electronic communications (e.g., data or voice communications). For example, the network 505 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 505 may include one or more networks that include wireless data channels and wireless voice channels. The network 505 may be a wireless network, a broadband network, or a combination of networks including a wireless network and a broadband network.

The monitoring system control unit 510 includes a controller 512 and a network module 514. The controller 512 is configured to control a monitoring system (e.g., a home alarm or security system) that includes the monitor control unit 510. In some examples, the controller 512 may include a processor or other control circuitry configured to execute instructions of a program that controls operation of an alarm system. In these examples, the controller 512 may be configured to receive input from indoor door knobs, sensors, detectors, or other devices included in the alarm system and control operations of devices included in the alarm system or other household devices (e.g., a thermostat, an appliance, lights, etc.). For example, the controller 512 may be configured to control operation of the network module 514 included in the monitoring system control unit 510.

The network module 514 is a communication device configured to exchange communications over the network 505. The network module 514 may be a wireless communication module configured to exchange wireless communications over the network 505. For example, the network module 514 may be a wireless communication device configured to exchange communications over a wireless data channel and a wireless voice channel. In this example, the network module 514 may transmit alarm data over a wireless data channel and establish a two-way voice communication session over a wireless voice channel. The wireless communication device may include one or more of a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 514 also may be a wired communication module configured to exchange communications over the network 505 using a wired connection. For instance, the network module 514 may be a modem, a network interface card, or another type of network interface device. The network module 514 may be an Ethernet network card configured to enable the monitoring control unit 510 to communicate over a local area network and/or the Internet. The network module 514 also may be a voiceband modem configured to enable the alarm panel to communicate over the telephone lines of Plain Old Telephone Systems (POTS).

The monitoring system may include multiple sensors 520. The sensors 520 may include a contact sensor, a motion sensor, a glass break sensor, or any other type of sensor included in an alarm system or security system. The sensors 520 also may include an environmental sensor, such as a temperature sensor, a water sensor, a rain sensor, a wind sensor, a light sensor, a smoke detector, a carbon monoxide detector, an air quality sensor, etc. The sensors 520 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 520 may include a radio-frequency identification (RFID) sensor that identifies a particular article that includes a pre-assigned RFID tag.

The monitoring system may include one or more cameras 530. The one or more cameras 530 may be video/photographic cameras or other type of optical sensing device configured to capture images. For instance, the cameras may be configured to capture images of an area within a building monitored by the monitor control unit 510. The cameras may be configured to capture single, static images of the area and also video images of the area in which multiple images of the area are captured at a relatively high frequency (e.g., thirty images per second). The cameras may be controlled based on commands received from the monitor control unit 510.

The cameras may be triggered by several different types of techniques. For instance, a Passive Infra Red (PIR) motion sensor may be built into the cameras and used to trigger the one or more cameras 530 to capture one or more images when motion is detected. The one or more cameras 530 also may include a microwave motion sensor built into the camera and used to trigger the camera to capture one or more images when motion is detected. Each of the one or more cameras 530 may have a "normally open" or "normally closed" digital input that can trigger capture of one or more images when external sensors (e.g., the sensors 520, PIR, door/window, etc.) detect motion or other events. In some implementations, at least one camera 530 receives a command to capture an image when external devices detect motion or another potential alarm event. The camera may receive the command from the controller 512 or directly from one of the sensors 520.

In some examples, the one or more cameras 530 triggers integrated or external illuminators (e.g., Infra Red, Z-wave controlled "white" lights, lights controlled by the module 514, etc.) to improve image quality when the scene is dark.

An integrated or separate light sensor may be used to determine if illumination is desired and may result in increased image quality.

The sensors 520 and the cameras 530 communicate with the controller 512 over communication links 524 and 526. The communication links 524 and 526 may be a wired or wireless data pathway configured to transmit signals from the sensors 520 and the cameras 530 to the controller 512. The communication links 524 and 526 may include a local network, such as 802.11 "Wi-Fi" wireless Ethernet (e.g., using low-power Wi-Fi chipsets), Z-Wave, Zigbee, Bluetooth, "HomePlug" or other Powerline networks that operate over AC wiring, and a Category 5 (CAT5) or Category 6 (CAT6) wired Ethernet network.

The monitoring application server 560 is an electronic device configured to provide monitoring services by exchanging electronic communications with the monitor control unit 510, and the one or more user devices 540, over the network 505. For example, the monitoring application server 560 may be configured to monitor events (e.g., alarm events) generated by the monitor control unit 510. In this example, the monitoring application server 560 may exchange electronic communications with the network module 514 included in the monitoring system control unit 510 to receive information regarding events (e.g., alarm events) detected by the monitoring system control unit 510. The monitoring application server 560 also may receive information regarding events (e.g., alarm events) from the one or more user devices 540. The monitoring application server 560 may store data, e.g., still images, video streams, and events generated by the cameras 530.

The one or more user devices 540 are devices that host and display user interfaces. The user device 540 may be a cellular phone or a non-cellular locally networked device with a display. The user device 540 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 540 may perform functions unrelated to the monitoring system, such as placing personal telephone calls, playing music, playing video, displaying pictures, browsing the Internet, maintaining an electronic calendar, etc.

The user device 540 includes a monitoring application 542. The monitoring application 542 refers to a software/firmware program running on the corresponding mobile device that enables the user interface and features described throughout. The user device 540 may load or install the monitoring application 542 based on data received over a network or data received from local media. The monitoring application 542 runs on mobile devices platforms, such as iPhone, iPod touch, Blackberry, Google Android, Windows Mobile, etc. The monitoring application 542 enables the user device 540 to receive and process image and sensor data from the monitoring system.

The central alarm station server 570 is an electronic device configured to provide alarm monitoring service by exchanging communications with the monitor control unit 510, the one or more user devices 540, and the monitoring application server 560 over the network 505. For example, the central alarm station server 570 may be configured to monitor alarm events generated by the monitoring system control unit 510. In this example, the central alarm station server 570 may exchange communications with the network module 514 included in the monitor control unit 510 to receive information regarding alarm events detected by the monitor control unit 510. The central alarm station server 570 also may receive information regarding alarm events from the one or more user devices 540.

In some implementations, the one or more user devices 540 communicate with and receive monitoring system data from the monitor control unit 510 using the communication link 538. For instance, the one or more user devices 540 may communicate with the monitor control unit 510 using various local wireless protocols such as Wi-Fi, Bluetooth, Z-Wave, Zigbee, "HomePlug," or other Powerline networks that operate over AC wiring, or Power over Ethernet (POE), or wired protocols such as Ethernet and USB, to connect the one or more user devices 540 to local security and automation equipment. The one or more user devices 540 may connect locally to the monitoring system and its sensors and other devices. The local connection may improve the speed of status and control communications because communicating through the network 505 with a remote server (e.g., the monitoring application server 560) may be significantly slower.

Although the one or more user devices 540 are shown as communicating with the monitor control unit 510, the one or more user devices 540 may communicate directly with the sensors and other devices controlled by the monitor control unit 510. In some implementations, the one or more user devices 540 replace the monitoring system control unit 510 and perform the functions of the monitoring system control unit 510 for local monitoring and long range/offsite communication. Other arrangements and distribution of processing is possible and contemplated within the present disclosure.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices;

magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A monitoring system that is configured to monitor a property, the monitoring system comprising:
 a camera that includes a removable primary power source and a secondary power source and that is configured to:
  detect removal of the primary power source; and
  in response to detecting removal of the primary power source:
   draw power from the secondary power source; and
   generate a primary power source removal notification indicating that the primary power source has been removed from the camera; and
 a monitor control unit that is configured to:
  receive the primary power source removal notification;
  determine whether a primary power source removal request was received within a period of time before receipt of the primary power source removal notification, the primary power source removal request indicating that the primary power source will be removed within the period of time; and
  in response to determining whether the primary power source removal notification was received within the period of time before receiving the primary power source removal request, perform a monitoring system action.

2. The monitoring system of claim 1, wherein:
 the monitor control unit is configured to:
  determine whether the primary power source removal request was received within a period of time before receipt of the primary power source removal notification by determining that the primary power source removal request was received within the period of time before receipt of the primary power source removal notification; and
  perform the monitoring system action by providing, to the camera, an instruction to enter a low power mode in response to determining that the primary power source removal request was received within the period of time before receipt of the primary power source removal notification,
 the camera is configured to:
  receive the instruction to enter the low power mode;
  in response to receiving the instruction to enter the low power mode, enter the low power mode;
  detect replacement of the primary power source; and
  in response to detecting replacement of the primary power source, generate a primary power source replacement notification indicating that the primary power source of the camera has been replaced, and
 the monitor control unit is configured to:
  receive the primary power source replacement notification; and
  in response to receiving the primary power source replacement notification, provide, to the camera, an instruction to exit the low power mode.

3. The monitoring system of claim 2, wherein the camera is configured to enter the low power mode by:
 maintaining a network connection with the monitor control unit,
 reducing a frame rate for capturing video data,
 reducing a resolution for capturing the video data or image data, and
 storing the video data or the image data locally.

4. The monitoring system of claim 2, wherein the monitor control unit is configured to:
 determine an elapsed time between receiving the primary power source removal notification and receiving the primary power source replacement notification;
 determine whether the elapsed time satisfies a threshold replacement period of time; and
 provide, to the camera, the instruction to exit the low power mode based on determining that the elapsed time satisfies the threshold replacement period of time.

5. The monitoring system of claim 1, wherein:
 the monitor control unit is configured to:
  determine whether the primary power source removal request was received within a period of time before receipt of the primary power source removal notification by determining that the primary power source removal request was received within the period of time before receipt of the primary power source removal notification; and
  perform the monitoring system action by providing, to the camera, an instruction to enter a low power mode in response to determining that the primary power source removal request was received within the period of time before receipt of the primary power source removal notification,
 the camera is configured to:
  receive the instruction to enter the low power mode; and
  in response to receiving the instruction to enter the low power mode, enter the low power mode, and
 the monitor control unit is configured to:
  determine an elapsed time since providing the instruction to enter the low power mode;
  determine that the elapsed time since providing the instruction to enter the low power mode does not satisfy a threshold replacement period of time; and
  in response to determining that the elapsed time since providing the instruction to enter the low power mode does not satisfy the threshold replacement period of time, provide, for output, a notification indicating to replace the primary power source.

6. The monitoring system of claim 1, wherein:
 the monitor control unit is configured to:
  determine whether the primary power source removal request was received within a period of time before receipt of the primary power source removal notification by determining that the primary power source removal request was received within the period of time before receipt of the primary power source removal notification;
  determine that the monitoring system is unarmed; and
  perform the monitoring system action by providing, to the camera, an instruction to enter a low power mode based on determining that the monitoring system is unarmed and based on determining that the primary power source removal request was received within the period of time.

7. The monitoring system of claim 1, wherein the monitor control unit is configured to:
  determine that the monitoring system is in armed away mode; and
  perform the monitoring system action by generating an alarm based on determining that the monitoring system is in armed away mode.

8. The monitoring system of claim 1, wherein the monitor control unit is configured to:
  determine whether the primary power source removal request was received within a period of time by determining that the primary power source removal request was not received within the period of time; and
  perform the monitoring system action by generating an alarm based on determining that the primary power source removal request was not received within the period of time.

9. The monitoring system of claim 1, comprising:
  an additional camera,
  wherein the monitor control unit is configured to:
    determine whether the primary power source removal request was received within a period of time by determining that the primary power source removal request was not received within the period of time; and
    perform the monitoring system action by providing, to the additional camera, an instruction to move to capture a field of view of the camera.

10. The monitoring system of claim 1, wherein the monitor control unit is configured to:
  determine whether the primary power source removal request was received within a period of time before receipt of the primary power source removal notification by determining that the primary power source removal request was not received within the period of time before receipt of the primary power source removal notification; and
  perform the monitoring system action by providing, to the camera, an instruction to capture video data and transmit the video data to the monitor control unit before entering a low power mode.

11. The monitoring system of claim 1, wherein:
  the monitor control unit is configured to:
    determine whether the primary power source removal request was received within a period of time before receipt of the primary power source removal notification by determining that the primary power source removal request was not received within the period of time before receipt of the primary power source removal notification; and
    perform the monitoring system action by providing, to the camera, an instruction to transmit a power level of the primary power source at a time of detecting removal of the primary power source,
  the camera is configured to:
    receive the instruction to transmit the power level of the primary power source at the time of detecting removal of the primary power source; and
    transmit, to the monitor control unit, data indicating the power level of the primary power source at the time of detecting removal of the primary power source, and
  the monitor control unit is configured to:
    receive the data indicating the power level of the primary power source at the time of detecting removal of the primary power source; and
    perform the monitoring system action based on the power level of the primary power source at the time of detecting removal of the primary power source.

12. The monitoring system of claim 11, wherein the monitor control unit is configured to:
  determine that the power level of the primary power source at the time of detecting removal of the primary power source is less than a threshold power level; and
  perform the monitoring system action by generating a notification to replace the primary power source based on determining that the power level of the primary power source at the time of detecting removal of the primary power source is less than a threshold power level.

13. The monitoring system of claim 11, wherein the monitor control unit is configured to:
  determine that the power level of the primary power source at the time of detecting removal of the primary power source is greater than a threshold power level; and
  perform the monitoring system action by generating an alarm based on determining that the power level of the primary power source at the time of detecting removal of the primary power source is greater than a threshold power level.

14. A computer-implemented method comprising:
  detecting, by a camera of a monitoring system that is configured to monitor a property, removal of a primary power source, the camera including the removable primary power source and a secondary power source;
  in response to detecting removal of the primary power source, drawing, by the camera, power from the secondary power source;
  determining, by camera, whether a primary power source removal request was received within a period of time before detecting the removal of the primary power source, the primary power source removal request indicating that the primary power source will be removed within the period of time;
  in response to determining whether the primary power source removal notification was received within the period of time before receiving the primary power source removal request, performing, by the camera, an action.

15. The method of claim 14, comprising:
  determining whether the primary power source removal request was received within a period of time before detecting the removal of the primary power source by determining that the primary power source removal request was received within the period of time before detecting the removal of the primary power source;
  performing the action by entering, by the camera, a low power mode in response to determining that the primary power source removal request was received within the period of time;
  detecting, by the camera, replacement of the primary power source; and
  in response to detecting replacement of the primary power source, exiting, by the camera, the low power mode.

16. The method of claim 14, comprising:
  determining whether the primary power source removal request was received within a period of time before detecting the removal of the primary power source by determining that the primary power source removal request was received within the period of time before detecting the removal of the primary power source;

perform the action by entering, by the camera, a low power mode in response to determining that the primary power source removal request was received within the period of time;

determining, by the camera, an elapsed time since entering the low power mode;

determining, by the camera, that the elapsed time since entering the low power mode does not satisfy a threshold replacement period of time; and in response to determining that the elapsed time since entering the low power mode does not satisfy the threshold replacement period of time, providing, for output by the camera, a notification indicating to replace the primary power source.

17. The method of claim 14, comprising:

determining whether the primary power source removal request was received within a period of time by determining that the primary power source removal request was received within the period of time;

determining, by the camera, that the monitoring system is unarmed; and performing the action by entering, by the camera, a low power mode based on determining that the monitoring system is unarmed and based on determining that the primary power source removal request was received within the period of time.

18. The method of claim 14, comprising:

determining that the monitoring system is in armed away mode; and performing the action by generating, by the camera, an alarm based on determining that the monitoring system is in armed away mode.

19. The method of claim 14, comprising:

determining whether the primary power source removal request was received within a period of time by determining that the primary power source removal request was not received within the period of time; and performing the action by generating, by the camera, an alarm based on determining that the primary power source removal request was not received within the period of time.

20. The method of claim 14, comprising:

determining whether the primary power source removal request was received within a period of time by determining that the primary power source removal request was not received within the period of time; and performing the action by capturing, by the camera, video data before entering a low power mode.

* * * * *